US012222013B2

(12) United States Patent
Xu et al.

(10) Patent No.: US 12,222,013 B2
(45) Date of Patent: Feb. 11, 2025

(54) ELECTROMAGNETIC BRAKE CONTROL APPARATUS

(71) Applicant: ALTRA INDUSTRIAL MOTION (SHENZHEN) CO., LTD., Shenzhen (CN)

(72) Inventors: Xiaowei Xu, Shenzhen (CN); Cha Lu, Shenzhen (CN)

(73) Assignee: Altra Industrial Motion (Shenzhen) Co., Ltd., Shenzhen (CN)

( * ) Notice: Subject to any disclaimer, the term of this patent is extended or adjusted under 35 U.S.C. 154(b) by 357 days.

(21) Appl. No.: 17/827,482

(22) Filed: May 27, 2022

(65) Prior Publication Data

US 2022/0299081 A1   Sep. 22, 2022

Related U.S. Application Data (63) Continuation of application No. PCT/CN2021/074569, filed on Jan. 31, 2021.

(30) Foreign Application Priority Data

Mar. 6, 2020 (CN) .......................... 202010152310.0

(51) Int. Cl.
F16D 65/18 (2006.01)
F16D 121/20 (2012.01)

(52) U.S. Cl.
CPC .......... F16D 65/18 (2013.01); *F16D 2121/20* (2013.01)

(58) Field of Classification Search
CPC .............................. F16D 65/18; F16D 2121/20
USPC .............. 188/156–164; 310/93, 94, 103, 111
See application file for complete search history.

(56) References Cited

U.S. PATENT DOCUMENTS

| 4,567,975 | A | * | 2/1986 | Roll ...................... F16D 48/064 |
| | | | | 192/52.4 |
| 9,488,233 | B2 | * | 11/2016 | Hayakawa .............. F16D 27/11 |
| 2006/0219497 | A1 | * | 10/2006 | Organek ................ F16D 27/025 |
| | | | | 188/161 |
| 2007/0199775 | A1 | | 8/2007 | Yasukawa |
| 2011/0094837 | A1 | | 4/2011 | Gewinner et al. |

(Continued)

FOREIGN PATENT DOCUMENTS

| CN | 2406321 Y | 11/2000 |
| CN | 201318406 Y | 9/2009 |

(Continued)

*Primary Examiner* — Christopher P Schwartz
(74) *Attorney, Agent, or Firm* — AP3 Law Firm PLLC (57) ABSTRACT

The application relates to the technical field of control, and provides an electromagnetic brake control apparatus. The apparatus includes: a power supply management circuit, a first switch circuit, a freewheeling diode and a first control output end and a second control output end used to connect with two ends of an electromagnetic coil of the electromagnetic brake; the power supply management circuit includes: a power supply input end, a first output end and a second output end used to connect with an external power supply; an input end and an output end of the first switch circuit are respectively connected with the first output end and the first control output end, the first switch circuit is configured with a pulse width modulation function; a cathode and an anode of the freewheeling diode are respectively connected with the second output end and the first control output end.

20 Claims, 3 Drawing Sheets

(56) References Cited

U.S. PATENT DOCUMENTS

| | | | | |
|---|---|---|---|---|
| 2015/0329318 A1* | 11/2015 | Cambruzzi | ............... | B66B 1/32 |
| | | | | 188/164 |
| 2017/0063259 A1* | 3/2017 | Schoenlinner | .......... | F16D 65/18 |
| 2017/0211640 A1* | 7/2017 | Pearce | ...................... | H02P 3/04 |

FOREIGN PATENT DOCUMENTS

| | | | | | |
|---|---|---|---|---|---|
| CN | 201433763 Y | | 3/2010 | | |
| CN | 202188050 U | | 4/2012 | | |
| CN | 105715709 A | | 6/2016 | | |
| CN | 109120187 A | * | 1/2019 | ................ | H02P 3/24 |
| JP | 2003292257 A | | 10/2003 | | |
| JP | 2017089679 A | | 5/2017 | | |

* cited by examiner

ELECTROMAGNETIC BRAKE CONTROL APPARATUS

CROSS-REFERENCE TO RELATED APPLICATIONS

This application is a continuation of International Application No. PCT/CN2021/074569, filed on Jan. 31, 2021, which claims priority to Chinese Patent Application No. 202010152310.0, filed on Mar. 6, 2020. The disclosures of the aforementioned applications are hereby incorporated by reference in their entireties.

TECHNICAL FIELD

The present application relates to the technical field of control, and particularly relates to an electromagnetic brake control apparatus.

BACKGROUND

Electromagnetic brake is an ideal automatic actuator in modern industry. It mainly plays the role of transmitting power and controlling movement in mechanical transmission system. It is widely used in various control fields. Controlling the electromagnetic coil of the electromagnetic brake through the power supply may realize the control of the armature in the electromagnetic brake, thereby controlling the pull-in or disconnection of the electromagnetic brake.

In the prior art, the control method of the electromagnetic brake is usually fixed voltage control. The disadvantage of the prior art is that the electromagnetic brake is pulled in under the rated voltage for a long time, which is easy to cause the electromagnetic brake to heat up and burn out, and there is a great potential safety hazard.

SUMMARY

These and other problems are generally solved or circumvented, and technical advantages are generally achieved, by embodiments of the present disclosure which provide an electromagnetic brake control apparatus.

Technical Problems

The present application provides an electromagnetic brake control apparatus, which is beneficial to reduce the heat generation of the electromagnetic brake and improve the use safety of the electromagnetic brake.

Technical Solutions

In order to achieve the above technical effects, the present application provides an electromagnetic brake control apparatus, which is applied to an electromagnetic brake, and the electromagnetic brake control apparatus includes: a power supply management circuit, a first switch circuit, a freewheeling diode, and a first control output end and a second control output end connectable with two ends of an electromagnetic coil of the electromagnetic brake.

The power supply management circuit includes: a power supply input end, a first output end and a second output end; the power supply input end is connectable with an external power supply.

An input end of the first switch circuit is connected with the first output end, and an output end of the first switch circuit is connected with the first control output end, wherein the first switch circuit is configured with a pulse width modulation function.

A cathode of the freewheeling diode is connected with the second output end, and an anode of the freewheeling diode is connected with the first control output end.

The second output end is connected with the second control output end.

And the pulse width modulation function includes: performing a pulse width modulation based on a preset maintaining voltage value or a preset maintaining current value, wherein the preset maintaining voltage value is a voltage value that maintains an armature of the electromagnetic brake to pull in, and the preset maintaining current value is a current value that maintains the armature of the electromagnetic brake to pull in.

In one possible implementation, the electromagnetic brake control apparatus further includes a second switch circuit, the second output end is connected with the second control output end through the second switch circuit.

The second switch circuit is configured with a power-off quick response function and an overheat protection function.

The power-off quick response function includes: cutting off a current loop of the electromagnetic coil when the external power supply is disconnected.

And the overheat protection function includes: cutting off the current loop of the electromagnetic coil when a temperature of the electromagnetic brake control apparatus or the electromagnetic brake is higher than a threshold.

In one possible implementation, the first switch circuit includes a single-chip microcomputer and a first switch tube.

The input end of the first switch circuit is a power supply input pin of the single-chip microcomputer.

And the output end of the first switch circuit is a drain electrode of the first switch tube, a gate electrode of the first switch tube is connected with a pulse width modulation (PWM) signal output pin of the single-chip microcomputer, and a source electrode of the first switch tube is grounded.

In one possible implementation, the second switch circuit includes a first resistor, a second resistor, a second switch tube and a first Zener diode.

The first resistor is connected in parallel with the first Zener diode.

A cathode of the first Zener diode is connected with the second output end, and an anode of the first Zener diode is grounded through the second resistor.

And a gate electrode of the second switch tube is grounded through the second resistor, a source electrode of the second switch tube is connected with the second output end, and a drain electrode of the second switch tube is connected with the second control output end.

In one possible implementation, the single-chip microcomputer is configured with a working state signal output function.

The electromagnetic brake control apparatus further includes a working state indicating circuit, and the working state indicating circuit includes a light emitting diode and a third resistor.

A first end of the third resistor is connected with a universal output pin of the single-chip microcomputer, and a second end of the third resistor is connected with an anode of the light emitting diode; a cathode of the light emitting diode is grounded.

And the working state signal output function includes: controlling the universal output pin to output a signal of a corresponding frequency based on a duty ratio of a signal obtained by the pulse width modulation, wherein the corresponding frequency of the output signal is positively correlated with the duty ratio.

In one possible implementation, the pulse width modulation function includes: performing the pulse width modulation based on the preset maintaining voltage value.

The electromagnetic brake control apparatus further includes a voltage sampling circuit, the voltage sampling circuit includes a fourth resistor, a fifth resistor and a second Zener diode.

An analog signal input pin of the single-chip microcomputer is respectively connected with a first end of the fourth resistor, a first end of the fifth resistor and a cathode of the second Zener diode.

A second end of the fourth resistor is connected with the second output end.

And a second end of the fifth resistor and an anode of the second Zener diode are grounded.

In one possible implementation, the pulse width modulation function includes: performing the pulse width modulation based on the preset maintaining current value.

The electromagnetic brake control apparatus further includes a current sampling circuit, the current sampling circuit includes a sixth resistor and an operational amplifier circuit; the source electrode of the first switch tube is grounded through the sixth resistor.

The operational amplifier circuit includes: an operational amplifier, a first capacitor, a second capacitor, a seventh resistor, an eighth resistor, a ninth resistor, a tenth resistor, an eleventh resistor and a twelfth resistor.

A power supply input pin of the operational amplifier is connected with the first output end.

A first end of the first capacitor is connected with the first output end, and a second end of the first capacitor is grounded.

An output pin of the operational amplifier is respectively connected with a first end of the seventh resistor and an analog signal input pin of the single-chip microcomputer.

An inverting input pin of the operational amplifier is respectively connected with a second end of the seventh resistor and a first end of the eighth resistor.

A non-inverting input pin of the operational amplifier is respectively connected with a first end of the ninth resistor and a first end of the tenth resistor.

A ground pin of the operational amplifier and a second end of the ninth resistor are grounded.

A second end of the eighth resistor is respectively connected with a first end of the second capacitor and a first end of the eleventh resistor, and a second end of the eleventh resistor is grounded.

A second end of the tenth resistor is respectively connected with a second end of the second capacitor and a first end of the twelfth resistor.

And a second end of the twelfth resistor is connected with the source electrode of the first switch tube.

In one possible implementation, the external power supply is a DC power supply, the power supply input end includes: a positive electrode input end connectable with a positive electrode of the DC power supply, and a negative electrode input end connectable with a negative electrode of the DC power supply.

The power supply management circuit further includes: an input protection and filter circuit, and a voltage stabilizing integrated chip.

The input protection and filter circuit includes: a first fuse, a first transient voltage suppression diode, a Schottky diode and a third capacitor.

The positive electrode input end is a first end of the first fuse, and a second end of the first fuse is respectively connected with a first end of the first transient voltage suppression diode and an anode of the Schottky diode.

The negative electrode input end is a second end of the first transient voltage suppression diode, and the second end of the first transient voltage suppression diode is respectively connected and grounded with a first end of the third capacitor and a ground pin of the voltage stabilizing integrated chip.

The first output end of the power supply management circuit is an output pin of the voltage stabilizing integrated chip.

And the second output end of the power supply management circuit is an input pin of the voltage stabilizing integrated chip, wherein the input pin of the voltage stabilizing integrated chip is respectively connected with a cathode of the Schottky diode and a second end of the third capacitor.

In one possible implementation, the external power supply is an AC power supply, the power supply input end includes: a neutral wire input end connectable with a neutral wire end of the AC power supply, and a live wire input end connectable with a live wire end of the AC power supply.

The power supply management circuit further includes: an input protection and rectification circuit, a step-down circuit and a voltage reference circuit.

The input protection and rectification circuit includes: a second fuse, a thirteenth resistor and a rectifier bridge.

The step-down circuit includes: a fourteenth resistor, a fifteenth resistor, a sixteenth resistor, a third Zener diode, a fourth Zener diode, a fourth capacitor and a fifth capacitor.

The voltage reference circuit includes: a seventeenth resistor and a fifth Zener diode.

The live wire input end is a first end of the second fuse, and a second end of the second fuse is respectively connected with a first end of the thirteenth resistor and a first end of the rectifier bridge.

The neutral wire input end is a second end of the thirteenth resistor, and the second end of the thirteenth resistor is connected with a third end of the rectifier bridge.

The second output end of the power supply management circuit is a second end of the rectifier bridge, and the second end of the rectifier bridge is connected with a first end of the fourteenth resistor.

A second end of the fourteenth resistor is connected with a first end of the fifteenth resistor, a second end of the fifteenth resistor is respectively connected with a cathode of the third Zener diode, a first end of the fourth capacitor, a first end of the sixteenth resistor and a first end of the seventeenth resistor.

The first output end of the power supply management circuit is a second end of the sixteenth resistor, and the second end of the sixteenth resistor is respectively connected with a cathode of the fourth Zener diode and a first end of the fifth capacitor.

A second end of the seventeenth resistor is respectively connected with a cathode of the fifth Zener diode and a reference voltage input pin of the single-chip microcomputer.

And a fourth end of the rectifier bridge, an anode of the third Zener diode, a second end of the fourth capacitor, an anode of the fourth Zener diode, a second end of the fifth capacitor and an anode of the fifth Zener diode are grounded.

In one possible implementation, the electromagnetic brake control apparatus further includes a second transient voltage suppression diode, wherein two ends of the second transient voltage suppression diode are respectively connected with the first control output end and the second control output end.

Advantageous Effects of the Disclosure

The inventor of the application has found that when controlling the armature of the electromagnetic brake to pull in, a large voltage needs to be applied to the electromagnetic coil of the electromagnetic brake. After the armature of the electromagnetic brake is pulled in, the pull-in state of the armature of the electromagnetic brake can be maintained as long as the voltage at both ends of the electromagnetic coil of the electromagnetic brake is reduced within a certain range. Therefore, the electromagnetic brake control apparatus provided in the application is provided with a first switch circuit between the power supply management circuit and the first control output end. By connecting the first control output end and the second control output end with both ends of the electromagnetic coil of the electromagnetic brake respectively, and cooperating with the pulse width modulation function of the first switch circuit, the voltage or current applied to the electromagnetic coil of the electromagnetic brake can be controlled. Thus, it is conducive to realize the technical effect of "high electric energy pull-in and low electric energy maintenance", and avoid that the electromagnetic coil of the electromagnetic brake is in a high-voltage state for a long time in the process of the pull-in state of the armature of the electromagnetic brake, which is conducive to reduce the heating capacity of the electromagnetic brake and improving the use safety of the electromagnetic brake.

BRIEF DESCRIPTION OF THE DRAWINGS

In order to more clearly illustrate the technical solutions in the embodiments of the application, the following description briefly introduces the drawings used in the embodiments or the prior art, and it is obvious that the drawings in the following description are only some embodiments of the application, and that other drawings can be obtained from these drawings by a person skilled in the art without involving any inventive effort.

DETAILED DESCRIPTION OF ILLUSTRATIVE EMBODIMENTS

In the following description, for the purpose of illustration rather than limitation, specific details such as a specific system structure and technology are set forth in order to provide a thorough understanding of the embodiments of the present application. However, it should be apparent to those skilled in the art that the technical solutions of the present application can also be implemented in other embodiments without these specific details. In other instances, detailed descriptions of well-known systems, devices, circuits, and methods are omitted so as not to obscure the description of the present application with unnecessary detail.

It should be understood that when used in this specification and the appended claims, the term such as "comprise" and "include" indicates the presence of the described features, wholes, steps, operations, elements and/or components, but does not exclude one or more other features, wholes, steps, operations, elements, components and/or the presence or addition of a collection thereof.

It should also be understood that the terms used in the specification of the present application are for the purpose of describing particular embodiments only and are not intended to limit the present application. As used in this specification and the appended claims, the singular forms "a", "an" and "the" are intended to include the plural forms unless the context clearly dictates otherwise.

It should also be further understood that the term "and/or" used in the specification and the appended claims of the present application refers to any combination of one or more of the items listed in the associated and all possible combinations, and including these combinations.

As used in this specification and the appended claims, the term "if" may be contextually interpreted as "when" or "once" or "in response to determination" or "in response to detection". Similarly, the phrases "if it is determined" or "if the [described condition or event] is detected" can be interpreted, depending on the context, to mean "once it is determined" or "in response to the determination" or "once the [described condition or event] is detected" or "in response to detection of the [described condition or event]".

The technical solutions in the embodiments of the present application will be clearly and completely described below with reference to the accompanying drawings of the embodiments of the present application. Obviously, the described embodiments are only a part of the embodiments of the present application, rather than all the embodiments. Based on the embodiments in the present application, all other embodiments obtained by those of ordinary skill in the art without creative efforts shall fall within the protection scope of the present application.

Many specific details are set forth in the following description to facilitate a full understanding of the present application. However, the present application can also be implemented in other ways different from those described herein, and those skilled in the art can do similar promotion without departing from the connotation of the present application, therefore, the present application is not limited by the specific embodiments disclosed below.

Figure 1:
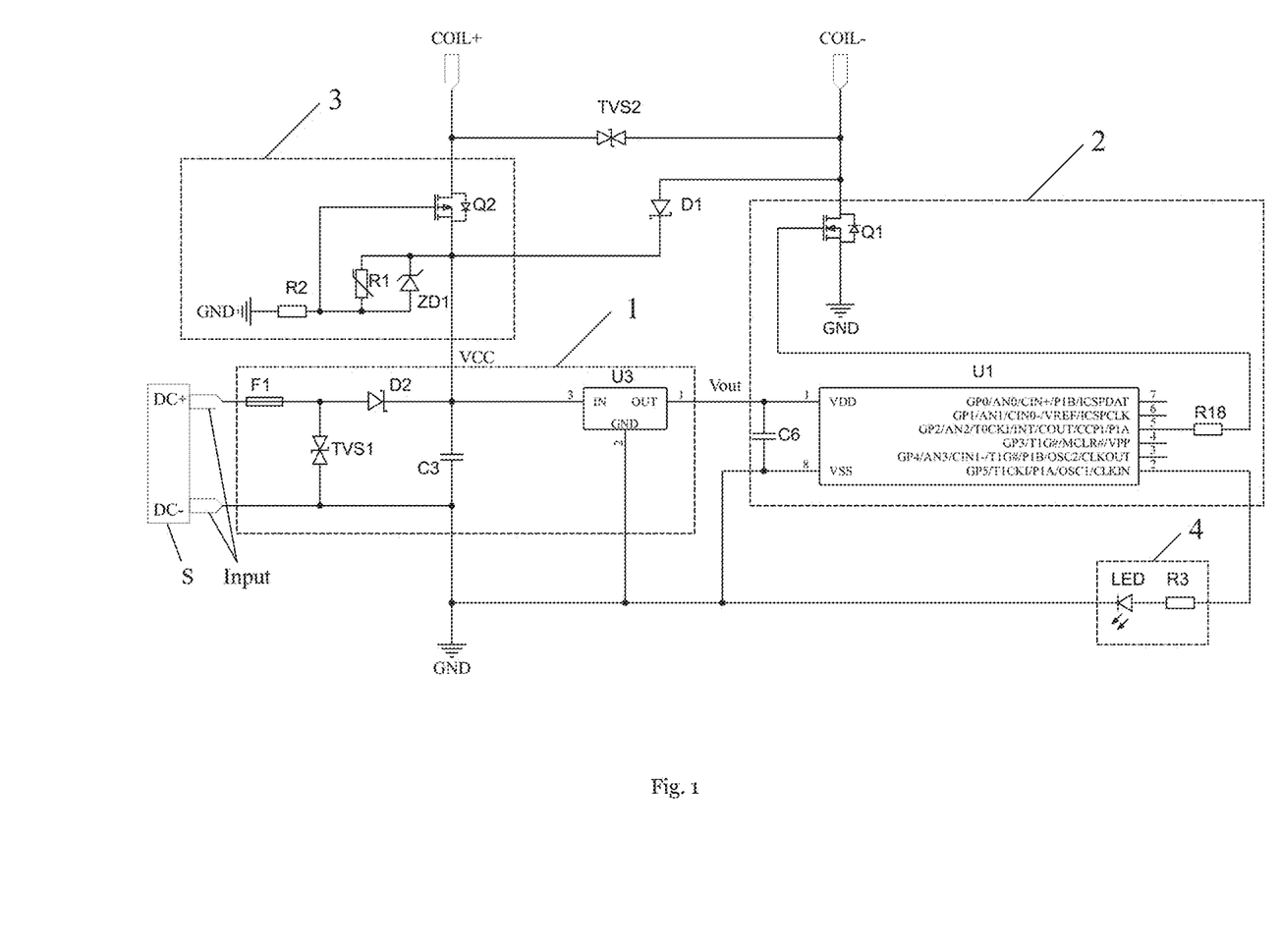
FIG. 1 is a schematic circuit diagram of an electromagnetic brake control apparatus provided by an embodiment of the present application.

FIG. 1 shows a circuit diagram of an electromagnetic brake control apparatus provided by the embodiment of the application. As shown in FIG. 1, the electromagnetic brake control apparatus includes:

a power supply management circuit 1, a first switch circuit 2, a freewheeling diode D1, and a first control output end COIL- and a second control output end COIL+ connectable with two ends of an electromagnetic coil of the electromagnetic brake; where the power supply management circuit 1 includes: a power supply input end Input, a first output end Vout and a second output end VCC; the power supply input end Input is connectable with an external power supply S; an input end of the first switch circuit 2 is connected with the first output end Vout, and an output end of the first switch circuit 2 is connected with the first control output end COIL-, where the first switch circuit 2 is configured with a pulse width modulation function; a cathode of the freewheeling diode D1 is connected with the second output end VCC, and an anode of the freewheeling diode D1 is connected with the first control output end COIL-; the second output end VCC is connected with the second control output end COIL+; the pulse width modulation function may include: performing a pulse width modulation based on a preset maintaining voltage value or a preset maintaining current value, where the preset maintaining voltage value is a voltage value that maintains an armature of the electromagnetic brake to pull in, and the preset maintaining current value is a current value that maintains the armature of the electromagnetic brake to pull in. The principle of the pulse width modulation function is to control the on-off of the first switch circuit 2 by controlling the pulse width, so as to realize the control of voltage or current.

According to the technical solutions, the electromagnetic brake control apparatus provided in the application is provided with a first switch circuit 2 between the power supply management circuit 1 and the first control output end COIL−. By connecting the first control output end COIL− and the second control output end COIL+ with both ends of the electromagnetic coil of the electromagnetic brake respectively, and cooperating with the pulse width modulation function of the first switch circuit 2, the voltage or current applied to the electromagnetic coil of the electromagnetic brake can be controlled. Thus, it is conducive to realize the technical effect of "high electric energy pull-in and low electric energy maintenance", and avoid that the electromagnetic coil of the electromagnetic brake is in a high-voltage state for a long time in the process of the pull-in state of the armature of the electromagnetic brake, which is conducive to reduce the heating capacity of the electromagnetic brake and improving the use safety of the electromagnetic brake.

The first switch circuit 2 performs pulse width modulation based on the preset maintaining voltage value or maintaining current value, and outputs the waveform after pulse width modulation, so as to control the voltage or current applied to the electromagnetic coil of the electromagnetic brake, so that the electromagnetic coil does not need to maintain the rated voltage or rated current all the time when the electromagnetic brake keeps the armature in the pull-in state for a long time, it can maintain normal use under the condition of lower than the rated voltage or rated current, so as to achieve the technical effect of reducing the heating capacity of electromagnetic brake and improving safety.

Further, since the electromagnetic brake control apparatus provided in the application can greatly reduce the heating capacity of the electromagnetic brake, the electromagnetic coil part of the electromagnetic brake may be made thinner to a certain extent, which is conducive to reducing the volume of the whole product and reducing the weight of the product.

In one embodiment, the freewheeling diode D1 is used to cooperate with the electromagnetic coil of the electromagnetic brake. The electromagnetic coil is an inductive load. When the current on the electromagnetic coil changes suddenly, sudden voltage will be generated at both ends of the electromagnetic coil, which may damage other components on the electromagnetic brake. When combined with freewheeling diode D1, the current on the electromagnetic coil may change smoothly to avoid sudden voltage. Specifically, the freewheeling diode D1 may be a fast recovery diode or Schottky diode, or other types of diodes, which are not specifically limited here.

In one embodiment, the maintaining voltage value (maintaining current value) may be the minimum voltage value (minimum current value) for maintaining the armature of the electromagnetic brake in the pull-in state, or it may be based on the electrical parameters and service environment of the electromagnetic brake, an optimal operating voltage value (optimal operating current value) obtained through experiment or simulation that is greater than the minimum voltage value (minimum current value) and less than the rated voltage value (rated current value) of the electromagnetic brake. Specifically, maintaining the optimal operating voltage value (the optimal operating current value) can ensure that the armature of the electromagnetic brake is normally pulled in, and can effectively reduce the heating capacity of the electromagnetic brake.

In an application scenario, when a faster armature pull-in speed is required, the electromagnetic brake control apparatus may be used to cooperate with an electromagnetic brake, where the electromagnetic brake has a rated voltage that is ½ (half) of the second output end VCC voltage. When the external power supply S is connected, the electromagnetic brake control apparatus outputs a voltage of wo % of the second output end VCC voltage to the electromagnetic coil of the electromagnetic brake. At this time, the voltage of the electromagnetic coil of the electromagnetic brake is twice the rated voltage, and the pull-in speed is faster. After the preset pull-in time, the first switch circuit 2 of the electromagnetic brake control apparatus controls the voltage applied to the electromagnetic coil of the electromagnetic brake through its pulse width modulation function, so as to realize low heating capacity.

In one embodiment, the first switch circuit 2 is also configured with a periodic re-pull-in function. The periodic re-pull-in function may include: based on a preset re-pull-in cycle and a preset re-pull-in time, periodically outputting a voltage of 100% of the second output end VCC voltage that maintains the preset re-pull-in time, so as to ensure that the armature of the electromagnetic brake may still be automatically re pulled in after accidental release due to severe vibration, large drop of power supply voltage, etc.

In one embodiment, the pulse width modulation function and the periodic re-pull-in function may also be realized based on the preset maintaining current value. In an application scenario, the current value of the electromagnetic coil of the electromagnetic brake may be collected and fed back to the first switch circuit 2. The first switch circuit 2 performs pulse width modulation adjustment based on the preset maintaining current value, the current value of the electromagnetic coil and the equivalent resistance to control the current applied to the electromagnetic coil, so that in the process of keeping the armature of the electromagnetic brake in the pull-in state, the current value on the electromagnetic coil is constant at the preset maintaining current value, so as to reduce the heating capacity of the electromagnetic brake while maintaining the pull-in state of the armature.

Further, when the electromagnetic coil of the electromagnetic brake is traditionally controlled based on voltage, it is generally necessary to consider 15% voltage fluctuation, that is, when the voltage applied to the electromagnetic coil is 85% of the rated voltage, the armature is still maintained the pull-in state. At the same time, with the continuous heating of the electromagnetic coil, the resistance of the electromagnetic coil gradually increases, and the pull-in voltage value of the electromagnetic coil (the minimum electromagnetic coil voltage value to maintain the armature in the pull-in state) will also change. Therefore, the design margin (error tolerance range) to be considered when controlling the electromagnetic coil of the electromagnetic brake based on the voltage is large. When the electromagnetic coil of the electromagnetic brake is controlled based on the current, (the pull-in current value of the electromagnetic brake (the minimum electromagnetic coil current value to maintain the armature in the pull-in state) hardly changes with the temperature. Therefore, when the constant current control is adopted, the design margin (error tolerance range) may be reduced, the temperature rise may be reduced and the power consumption may be saved; for the electromagnetic brake with electric braking, it may also achieve constant torque.

Optionally, as shown in FIG. 1, in one embodiment, the electromagnetic brake control apparatus further includes a second switch circuit 3, the second output end VCC is connected with the second control output end COIL+ through the second switch circuit 3; the second switch circuit 3 is configured with a power-off quick response function and an overheat protection function; the power-off quick response function may include: cutting off a current loop of the electromagnetic coil when the external power supply S is disconnected; and the overheat protection function may include: cutting off the current loop of the electromagnetic coil when a temperature of the electromagnetic brake control apparatus or the electromagnetic brake is too high, for example, the temperature is higher than a threshold.

In one embodiment, cutting off the current loop of the electromagnetic coil may include realized by cutting off the second output end VCC and the second control output end COIL+. In an application scenario, the overheat protection function may include: cutting off the current loop of the electromagnetic coil when the temperature of the electromagnetic brake control apparatus or the electromagnetic brake is greater than a temperature threshold, and reconnecting the current loop of the electromagnetic coil when the temperature of the electromagnetic brake control apparatus or the electromagnetic brake is lower than the temperature threshold.

As shown in FIG. 1, in one embodiment, the first switch circuit 2 includes a single-chip microcomputer U1 and a first switch tube Q1; the input end of the first switch circuit 2 is a power supply input pin of the single-chip microcomputer U1, that is the power supply input pin (No. 1 pin) of the single-chip microcomputer U1; and the output end of the first switch circuit 2 is a drain electrode of the first switch tube Q1, a gate electrode of the first switch tube Q1 is connected with a PWM signal output pin (No. 5 pin) of the single-chip microcomputer U1, and a source electrode of the first switch tube Q1 is grounded.

In this embodiment, the model of the single-chip microcomputer U1 may be PIC12F615-1/SN, and the first switch tube Q1 may be an N-channel MOS tube. The single-chip microcomputer U1 generates a pulse width modulation (PWM) signal to control the periodic on and off of the first switch tube Q1. As shown in FIG. 1, when the first switch tube Q1 is turned on, the freewheeling diode D1 is cut off in reverse, and the electromagnetic coil obtains a pulse voltage close to the external power supply S; when the first switch tube Q1 is turned off, the freewheeling diode D1 is turned on, the current on the electromagnetic coil forms a loop through the freewheeling diode D1, and the current flowing through the electromagnetic coil is almost constant. As shown in FIG. 1, when the external power supply S is a DC power supply, according to the PWM principle, the relationship between the equivalent output voltage $U_{OUT}$, the second output end VCC voltage $U_S$ and the duty ratio D is: $U_{OUT}=D*U_S$. The duty ratio D refers to the percentage of the time when the circuit is turned on in the whole circuit working cycle. By writing a program to the single-chip microcomputer U1 to adjust the duty ratio D, the equivalent output voltage $U_{OUT}$ can be adjusted arbitrarily between 100% and 0% of the second output end VCC voltage $U_S$. In an application scenario, various control parameters and optional functions of different electromagnetic brakes may be realized by writing different programs to the single-chip microcomputer U1, which greatly improves the practicability of the electromagnetic brake control apparatus.

In one application scenario, the first switch tube Q1 is controlled by the single-chip microcomputer U1, and a voltage of 100% of the second output end VCC voltage is continuously output for 0.3 seconds after the external power supply S is connected, and then the voltage is adjusted to 50%-30% of the second output end VCC until the external power supply S is disconnected. The heating power $P=U^2/R$, so the heating capacity of the electromagnetic coil of the electromagnetic brake is about 25%-10% of the fixed voltage control. In this way, the heating capacity of the electromagnetic brake may be reduced and the electric energy consumption may be saved.

In this embodiment, the first switch circuit 2 also includes a sixth capacitor C6 and an eighteenth resistor R18. The sixth capacitor C6 is connected between the power supply input pin (No. 1 pin) and the ground pin (No. 8 pin) of the single-chip microcomputer U1 for decoupling, and the sixth capacitor C6 may be 100 nano Farad (nF) (1 F=10⁹ nF); the eighteenth resistor R18 may be 10Ω.

As shown in FIG. 1, in one embodiment, the second switch circuit 3 includes a first resistor R1, a second resistor R2, a second switch tube Q2 and a first Zener diode ZD1. The first resistor R1 is connected in parallel with the first Zener diode ZD1; a cathode of the first Zener diode ZD1 is connected with the second output end VCC, and an anode of the first Zener diode ZD1 is grounded through the second resistor R2; and a gate electrode of the second switch tube Q2 is grounded through the second resistor R2, a source electrode of the second switch tube Q2 is connected with the second output end VCC, and a drain electrode of the second switch tube Q2 is connected with the second control output end COIL+.

In this embodiment, the second switch tube Q2 may be a P-channel MOS tube. When the external power supply S is normally powered, the gate electrode voltage of the second switch tube Q2 is about 11V lower than the source electrode voltage, and the second switch tube Q2 is turned on to ensure that the electromagnetic coil forms a normal current loop. When the external power supply S is disconnected, the gate electrode voltage and source electrode voltage of the second switch tube Q2 are rapidly reduced to zero, the second switch tube Q2 is turned off, so that the current loop of the electromagnetic coil is quickly disconnected, and the current value on the electromagnetic coil is instantly attenuated to zero. Therefore, when the external power supply S is disconnected, the freewheeling effect of the freewheeling diode D1 is eliminated, so that the armature of the electromagnetic brake is quickly released. The first resistor R1 is a negative temperature coefficient (NTC) thermistor. When the temperature is higher than the temperature threshold, the resistance value of the first resistor R1 becomes very low, so that the first Zener diode ZD1 is short circuited, so that the gate electrode voltage of the second switch tube Q2 is close to the source electrode voltage, and the second switch tube Q2 is turned off, so that the current loop of the electromagnetic coil is disconnected. Specifically, when the temperature is reduced to less than the temperature threshold, the resistance value of the first resistor R1 returns to normal, so that the second switch tube Q2 is turned on again, and the electromagnetic brake works normally again. In this way, the automatic temperature protection of electromagnetic brake may be realized to avoid overheating and burning out.

Figure 2:
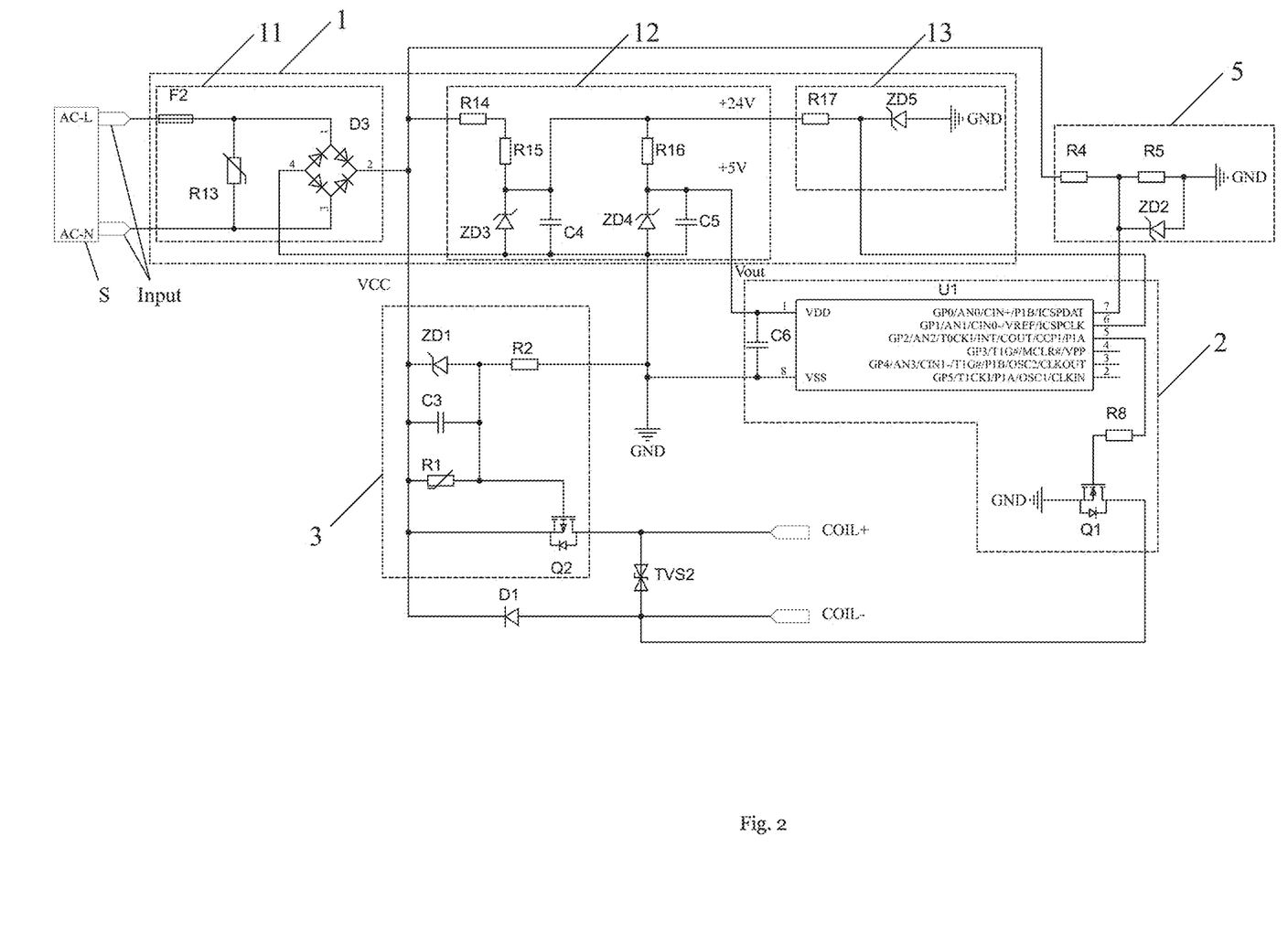
FIG. 2 is a schematic circuit diagram of an electromagnetic brake control apparatus provided by an embodiment of the present application.

In one embodiment, as shown in FIG. 2, the electromagnetic brake control apparatus further includes a working state indicating circuit 4, the working state indicating circuit 4 includes a light emitting diode LED and a third resistor R3, the single-chip microcomputer U1 is also configured with a working state signal output function. A first end of the third resistor R3 is connected with a universal output pin (No. 2 pin) of the single-chip microcomputer U1, and a second end of the third resistor R3 is connected with an anode of the light emitting diode LED; a cathode of the light emitting diode LED is grounded. The working state signal output function may include: controlling the universal output pin (No. 2 pin) to output a working state signal of a corresponding frequency based on a duty ratio of a PWM signal obtained by the pulse width modulation, so as to control the flashing frequency of the light emitting diode LED, where the corresponding frequency of the working state signal is positively correlated with the duty ratio. In an application scenario, when the duty ratio is 90%, the flashing frequency of the light emitting diode LED is 9 Hz; when the duty ratio is 100%, the flashing frequency of the light emitting diode LED is 10 Hz; when there is no output, the light emitting diode LED does not light up.

In one embodiment, the pulse width modulation function may include: performing the pulse width modulation based on the preset maintaining voltage value. The electromagnetic brake control apparatus further includes a voltage sampling circuit 5, as shown in FIG. 2, the voltage sampling circuit 5 includes a fourth resistor R4, a fifth resistor R5 and a second Zener diode ZD2; an analog signal input pin (No. 7 pin) of the single-chip microcomputer U1 is respectively connected with a first end of the fourth resistor R4, a first end of the fifth resistor R5 and a cathode of the second Zener diode ZD2; a second end of the fourth resistor R4 is connected with the second output end VCC; and a second end of the fifth resistor R5 and an anode of the second Zener diode ZD2 are grounded. Specifically, the fourth resistor R4 and the fifth resistor R5 adopt the principle of resistance division voltage for voltage sampling, input the sampled voltage into the analog signal input pin (No. 7 pin) of the single-chip microcomputer U1, and conduct AD conversion and processing through the single-chip microcomputer U1 to obtain the voltage value of the second output end VCC. The second Zener diode ZD2 is used to limit the maximum value of the sampled voltage and avoid damaging the single-chip microcomputer U1 due to the excessively high voltage value of the second output end VCC.

In one embodiment, the single-chip microcomputer U1 is also configured with a release function. The release function may include: comparing the sampled voltage with a preset release voltage value, when the sampled voltage is lower than the preset release voltage value, disconnect the current loop where the electromagnetic coil is located to release the armature. In an application scenario, the first switch tube Q1 may be continuously turned off by controlling the PWM signal output by the single-chip microcomputer U1, so as to release the armature of the electromagnetic brake.

Figure 3:
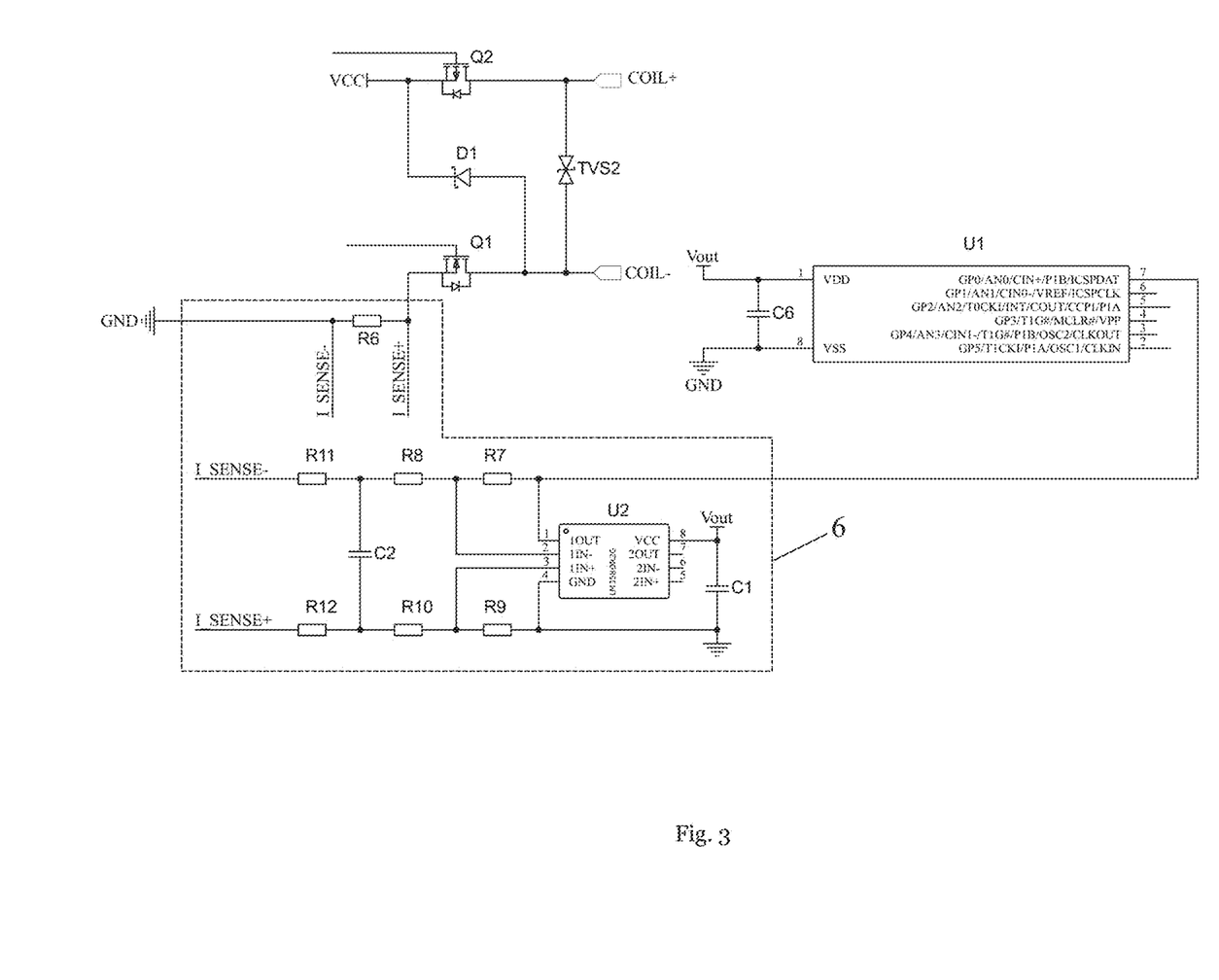
FIG. 3 is a schematic circuit diagram of a current sampling circuit of an electromagnetic brake control apparatus provided by an embodiment of the present application.

In one embodiment, the pulse width modulation function may include: performing the pulse width modulation based on the preset maintaining current value. The electromagnetic brake control apparatus further includes a current sampling circuit 6, FIG. 3 shows the current sampling circuit 6 and its connection mode in the electromagnetic brake control apparatus, the connection mode of other circuits or circuits is not fully shown, please refer to FIG. 1 and FIG. 2 above. As shown in FIG. 3, the current sampling circuit 6 includes a sixth resistor R6 and an operational amplifier circuit; the source electrode of the first switch tube Q1 is grounded through the sixth resistor R6; the operational amplifier circuit includes: an operational amplifier U2, a first capacitor C1, a second capacitor C2, a seventh resistor R7, an eighth resistor R8, a ninth resistor R9, a tenth resistor R10, an eleventh resistor R11 and a twelfth resistor R12.

In an application scenario, the model of the operational amplifier U2 may be LM358DR2G. A power supply input pin (No. 8 pin) of the operational amplifier U2 is connected with the first output end Vout; a first end of the first capacitor C1 is connected with the first output end Vout, and a second end of the first capacitor C1 is grounded; an output pin (No. 1 pin) of the operational amplifier U2 is respectively connected with a first end of the seventh resistor R7 and an analog signal input pin (No. 7 pin) of the single-chip microcomputer U1; an inverting input pin (No. 2 pin) of the operational amplifier U2 is respectively connected with a second end of the seventh resistor R7 and a first end of the eighth resistor R8; a non-inverting input pin (No. 3 pin) of the operational amplifier U2 is respectively connected with a first end of the ninth resistor R9 and a first end of the tenth resistor R10; a ground pin (No. 4 pin) of the operational amplifier U2 and a second end of the ninth resistor R9 are grounded; a second end of the eighth resistor R8 is respectively connected with a first end of the second capacitor C2 and a first end of the eleventh resistor R11, and a second end of the eleventh resistor R11 is grounded; a second end of the tenth resistor R10 is respectively connected with a second end of the second capacitor C2 and a first end of the twelfth resistor R12; and a second end of the twelfth resistor R12 is connected with the source electrode of the first switch tube Q1. The first capacitor C1 is connected with the power supply input pin (No. 8 pin) of the operational amplifier U2 and the ground pin (No. 4 pin) for decoupling.

In one embodiment, the sixth resistor R6 is a sampled resistance with a very small resistance (may be 0.05Ω in this embodiment), and the operational amplifier circuit obtains the sampled current after operation amplification and feeds it back to the single-chip microcomputer U1. The single-chip microcomputer U1 may control the current channel of the electromagnetic coil loop based on the preset maintaining current value and the obtained sampled current value.

With the increase of service time, the friction plate of the electromagnetic brake will gradually wear and thin. The thinning of the friction plate will indirectly lead to the increase of the gap, which requires a greater excitation current (the current in the electromagnetic coil) to make the armature pull in. When the required excitation current exceeds the current that the electromagnetic coil of the electromagnetic brake can get under the minimum working voltage and maximum working temperature, the armature will have the risk of failure to pull in, that is, the service life of the electromagnetic brake will end.

In an application scenario, the sampled current may also be used to detect the service life of the electromagnetic brake, and the single-chip microcomputer U1 is also configured with a service life detection function. The service life detection function is: detecting the service life of the electromagnetic brake based on the sampled current value and the preset excitation current value. Specifically, the current obtained by the electromagnetic brake under the minimum working voltage and the maximum working temperature is stored in the single-chip microcomputer U1 as the preset excitation current $I_M$. According to the current variation law during the pull-in process of the electromagnetic brake, based on the current sampling circuit 6, the current $I_P$ at the moment when the armature of the electromagnetic brake starts to move is detected by detection means, which is compared with the preset excitation current $I_M$, when $I_P > A*I_M$, judge the end of the service life of the electromagnetic brake and give an alarm prompt, where A is a preset tolerance. In order to avoid misjudgment, the $I_P$ value of the last 12 times may be recorded in the single-chip microcomputer U1, the maximum two values and the minimum two values may be removed, the remaining eight values are averaged to obtain $I_{PA}$, and the service life is detected based on the value of the $I_{PA}$. Through the service life detection function, the user may know in advance that the service life of the electromagnetic brake will end, so as to replace it in advance, avoid loss and improve safety.

In an application scenario, as shown in FIG. 1, the external power supply S is a DC power supply, the power supply input end Input includes: a positive electrode input end DC+ connectable with a positive electrode of the DC power supply, and a negative electrode input end DC− connectable with a negative electrode of the DC power supply; the power supply management circuit 1 further includes: an input protection and filter circuit, and a voltage stabilizing integrated chip U3; the input protection and filter circuit includes: a first fuse F1, a first transient voltage suppression diode TVS1, a Schottky diode D2 and a third capacitor C3; the positive electrode input end DC+ is a first end of the first fuse F1, and a second end of the first fuse F1 is respectively connected with a first end of the first transient voltage suppression diode TVS1 and an anode of the Schottky diode D2; the negative electrode input end DC− is a second end of the first transient voltage suppression diode TVS1, and the second end of the first transient voltage suppression diode TVS1 is respectively connected and grounded with a first end of the third capacitor C3 and a ground pin (No. 2 pin) of the voltage stabilizing integrated chip U3; the first output end Vout of the power supply management circuit 1 is an output pin (No. 1 pin) of the voltage stabilizing integrated chip U3; and the second output end VCC of the power supply management circuit 1 is an input pin (No. 3 pin) of the voltage stabilizing integrated chip U3, where the input pin of the voltage stabilizing integrated chip U3 is respectively connected with a cathode of the Schottky diode D2 and a second end of the third capacitor C3.

Specifically, the model of the voltage stabilizing integrated chip U3 may be 78L05, the first fuse F1 is used for short-circuit protection, the first transient voltage suppression diode TVS1 is used to suppress the surge voltage of the positive electrode input end DC+ and the negative electrode input end DC−, and the Schottky diode D2 is used for anti reverse connection protection of the positive electrode input end DC+ and the negative electrode input end DC−; the third capacitor C3 is used for filtering, the voltage stabilizing integrated chip U3 is used to provide a stable working voltage for the single-chip microcomputer U1, and the voltage output end by the first output end Vout is 5V.

In an application scenario, as shown in FIG. 2, the external power supply is an AC power supply, the power supply input end Input includes: a neutral wire input end AC-N connectable with a neutral wire end of the AC power supply, and a live wire input end AC-L connectable with a live wire end of the AC power supply; the power supply management circuit 1 further includes: an input protection and rectification circuit 11, a step-down circuit 12 and a voltage reference circuit 13; the input protection and rectification circuit 11 includes: a second fuse F2, a thirteenth resistor R13 and a rectifier bridge D3; the step-down circuit 12 includes: a fourteenth resistor R14, a fifteenth resistor R15, a sixteenth resistor R16, a third Zener diode ZD3, a fourth Zener diode ZD4, a fourth capacitor C4 and a fifth capacitor C5; the voltage reference circuit 13 includes: a seventeenth resistor R17 and a fifth Zener diode ZD5.

The live wire input end AC-L is a first end of the second fuse F2, and a second end of the second fuse F2 is respectively connected with a first end of the thirteenth resistor R13 and a first end of the rectifier bridge D3; the neutral wire input end AC-N is a second end of the thirteenth resistor R13, and the second end of the thirteenth resistor R13 is connected with a third end of the rectifier bridge D3; the second output end VCC of the power supply management circuit 1 is a second end of the rectifier bridge D3, and the second end of the rectifier bridge D3 is connected with a first end of the fourteenth resistor R14; a second end of the fourteenth resistor R14 is connected with a first end of the fifteenth resistor R15, a second end of the fifteenth resistor R15 is respectively connected with a cathode of the third Zener diode ZD3, a first end of the fourth capacitor C4, a first end of the sixteenth resistor R16 and a first end of the seventeenth resistor R17; the first output end Vout of the power supply management circuit 1 is a second end of the sixteenth resistor R16, and the second end of the sixteenth resistor R16 is respectively connected with a cathode of the fourth Zener diode ZD4 and a first end of the fifth capacitor C5; a second end of the seventeenth resistor R17 is respectively connected with a cathode of the fifth Zener diode ZD5 and a reference voltage input pin (No. 6 pin) of the single-chip microcomputer U1; and a fourth end of the rectifier bridge D3, an anode of the third Zener diode ZD3, a second end of the fourth capacitor C4, an anode of the fourth Zener diode ZD4, a second end of the fifth capacitor C5 and an anode of the fifth Zener diode ZD5 are grounded.

The second fuse F2 is used for short-circuit protection, the thirteenth resistor R13 is a varistor, which is used to suppress the surge voltage of the neutral wire input end AC-N and the live wire input end AC-L, and the rectifier bridge D3 is used to rectify AC to DC. The step-down circuit 12 obtains 5V and 24V of a smooth DC respectively, where 5V of the smooth DC is used to supply power to the single-chip microcomputer U1. The voltage reference circuit 13 obtains a reference voltage of 5V without non fluctuation basically to the single-chip microcomputer U1 as the reference voltage for AD conversion.

In an application scenario, when the external power supply S is the AC power supply, the expected equivalent voltage of the electromagnetic brake control apparatus is $U_{OUT}$, and the single-chip microcomputer U1 obtains the voltage instantaneous value u1 after rectification of the AC power supply through the voltage sampling circuit 5 and the voltage reference circuit 13, then the instantaneous value d of the duty ratio of the PWM voltage pulse signal output by the single-chip microcomputer U1 is:

$$d = \begin{cases} 100\%, & u_1 \le U_{OUT} \\ U_{OUT}/u_1, & u_1 > U_{OUT} \end{cases},$$

where the expected equivalent voltage $U_{OUT}$ is the maintaining voltage value preset in the single-chip microcomputer U1, which may be preset and changed based on the electrical parameters of the electromagnetic brake.

In an application scenario, when the external power supply S is the AC power supply, the single-chip microcomputer U1 is also configured with a preset signal output function. The preset signal output function is to periodically synchronize a preset signal based on the sampled voltage obtained from the analog signal input pin (No. 7 pin) of the single-chip microcomputer U1, and output the preset signal through the PWM signal output pin (No. 5 pin) of the single-chip microcomputer U1. Specifically, the preset signal is a PWM signal preset in the single-chip microcomputer U1; for the determined AC power supply, the waveform obtained after rectification is periodic and the period is determined; therefore, the function of the instantaneous value d of the duty ratio of the optimal PWM signal with time for each of the electromagnetic brake control apparatuses in a cycle may be calculated through simulation or experimental simulation, and the optimal PWM signal may be configured in the single-chip microcomputer U1.

When in use, the single-chip microcomputer U1 obtains the sampled voltage through the voltage sampling circuit 5, and compares the sampled voltage with a preset cycle starting voltage value through the built-in voltage comparator. When the sampled voltage at a certain time is less than or equal to the cycle starting voltage, it is judged that the time is a cycle starting time of the sampled voltage, and the optimal PWM signal is periodically synchronized and output with the sampled voltage, so as to control the electromagnetic brake. The preset cycle starting voltage value is a positive number close to zero. When the single-chip microcomputer U1 outputs the preset signal, it is no longer necessary to carry out the pulse width modulation and output in real time. When the single-chip microcomputer U1 outputs the preset signal, it is not necessary to provide the reference voltage by the voltage reference circuit 13, nor to carry out the AD conversion and calculation of the sampled voltage value in real time, which can make the circuit structure of the electromagnetic brake control apparatus simpler, and make the electromagnetic coil obtain a smoother current than the current obtained based on the pulse width modulation function.

As shown in FIG. 1 and FIG. 2, in one embodiment, the electromagnetic brake control apparatus further includes a second transient voltage suppression diode TVS2, and two ends of the second transient voltage suppression diode TVS2 are respectively connected with the first control output COIL− end and the second control output end COIL+. Specifically, when the external power supply S is disconnected, the first switch tube Q1 and the second switch tube Q2 are turned off, and a high back emf will be generated during the instantaneous attenuation of the current of the electromagnetic coil to zero. The second transient voltage suppression diode TVS2 is used to suppress the back emf generated by the electromagnetic coil and protect the electromagnetic brake control apparatus.

Those skilled in the art may understand that the electrical parameters of the electronic components may be selected according to the actual needs. Moreover, some devices or circuits may be replaced with other devices or circuits that can realize the same function in the prior art, which shall not be deemed to be beyond the protection scope of the application.

Those skilled in the art may clearly understand that for the convenience and simplicity of description, only the division of the functional units and modules is illustrated. In practical application, the functions may be allocated by different functional units and modules according to needs, that is, the internal structure of the system may be divided into different functional units or modules to complete all or part of the functions described above. Each functional unit and module in the embodiment may be integrated into one processing unit, or each unit may exist separately, or two or more units may be integrated into one unit. The integrated unit may be realized in the form of hardware or software functional unit. In addition, the specific names of each functional unit and module are only for mutual distinction and are not used to limit the scope of protection of the application. The specific working process of units and modules in the system may refer to the corresponding process in the above short-circuit protection circuit embodiment, which will not be repeated here.

In the above embodiments, the description of each embodiment has its own emphasis. For the parts not detailed or recorded in one embodiment, please refer to the relevant description of other embodiments.

Those skilled in the art may realize that the unit and circuit arrangement of each example described in combination with the embodiments disclosed herein can be realized by electronic hardware, or a combination of computer software and electronic hardware. Whether these functions are performed in hardware or software depends on the specific application and design constraints of the technical scheme. Professional technicians may use different methods to realize the described functions for each specific application, but such realization should not be considered to be beyond the scope of this application.

In the embodiments provided in the present application, it should be understood that the disclosed device/system/circuit may be realized in other ways. For example, the device/system/circuit embodiments described above are only schematic. For example, the division of the above modules or units is only a logical function division, which may be realized by another division method. For example, multiple units or components may be combined or integrated into another system, or some features may be ignored or not executed.

If the above integrated circuits/modules/units are implemented in the form of software functional units and sold or used as independent products, they may be stored in a computer-readable storage medium. Based on this understanding, the implementation of all or part of the modules of the above embodiment in the application may also be completed by instructing relevant hardware through a computer program. The computer program may be stored in a computer-readable storage medium, and the computer program may realize the functions of the above circuit/module/unit when executed by the processor. The computer program includes computer program code, which may be in the form of source code, object code, executable file or some intermediate forms. The computer-readable medium may include any entity or device capable of carrying the computer program code, recording medium, USB flash disk, mobile hard disk, magnetic disc, optical disc, computer memory, read only memory (ROM), random access memory (RAM), electric carrier signal, telecommunication signal, software distribution medium, etc. It should be noted that the content contained in the above computer-readable storage medium may be appropriately increased or decreased according to the requirements of legislation and patent practice in the jurisdiction.

The above embodiments are only used to illustrate the technical scheme of the application, not to limit it; although the application has been described in detail with reference to the above embodiments, those skilled in the art should understand that they can still modify the technical solutions recorded in the above embodiments or replace some of the technical features equally; these modifications or substitutions are not the essence of the corresponding technical solutions divorced from the spirit and scope of the technical solutions of the embodiments of the application, and should be included in the protection scope of the application. It can be understood that the parts in the above embodiments can be freely combined or deleted to form different combined embodiments. Here, the specific contents of each combined embodiment will not be repeated. After this description, it can be considered that the description has recorded each combined embodiment and can support different combined embodiments.

What is claimed is:

1. An electromagnetic brake control apparatus applied to an electromagnetic brake, wherein the electromagnetic brake control apparatus comprises:
   a power supply management circuit, a first switch circuit, a freewheeling diode, and a first control output end and a second control output end connectable with two ends of an electromagnetic coil of the electromagnetic brake;
   wherein the power supply management circuit comprises: a power supply input end, a first output end and a second output end; the power supply input end is connectable with an external power supply;
   an input end of the first switch circuit is connected with the first output end, and an output end of the first switch circuit is connected with the first control output end;
   a cathode of the freewheeling diode is connected with the second output end, and an anode of the freewheeling diode is connected with the first control output end;
   the second output end is connected with the second control output end; and
   the first switch circuit is configured with a pulse width modulation function, the pulse width modulation function comprises: performing a pulse width modulation on a preset maintaining voltage value or a preset maintaining current value, wherein the preset maintaining voltage value is a voltage value that maintains an armature of the electromagnetic brake to be attracted under a magnetic field generated by a magnetic coil of the electromagnetic brake, and the preset maintaining current value is a current value that maintains the armature of the electromagnetic brake to be attracted under the magnetic field generated by the magnetic coil of the electromagnetic brake.

2. The electromagnetic brake control apparatus according to claim 1, further comprising a second switch circuit, the second output end is connected with the second control output end through the second switch circuit;
   wherein the second switch circuit is configured with a power-off quick response function and an overheat protection function;
   the power-off quick response function comprises: cutting off a current loop of the electromagnetic coil when the external power supply is disconnected; and
   the overheat protection function comprises: cutting off the current loop of the electromagnetic coil when a temperature of the electromagnetic brake control apparatus or the electromagnetic brake is higher than a threshold.

3. The electromagnetic brake control apparatus according to claim 2, wherein the first switch circuit comprises a single-chip microcomputer and a first switch tube;
   the input end of the first switch circuit is a power supply input pin of the single-chip microcomputer; and
   the output end of the first switch circuit is a drain electrode of the first switch tube, a gate electrode of the first switch tube is connected with a pulse width modulation (PWM) signal output pin of the single-chip microcomputer, and a source electrode of the first switch tube is grounded.

4. The electromagnetic brake control apparatus according to claim 3, wherein the second switch circuit comprises a first resistor, a second resistor, a second switch tube and a first Zener diode;
   the first resistor is connected in parallel with the first Zener diode;
   a cathode of the first Zener diode is connected with the second output end, and an anode of the first Zener diode is grounded through the second resistor; and
   a gate electrode of the second switch tube is grounded through the second resistor, a source electrode of the second switch tube is connected with the second output end, and a drain electrode of the second switch tube is connected with the second control output end.

5. The electromagnetic brake control apparatus according to claim 4, further comprising a first transient voltage suppression diode, wherein two ends of the first transient voltage suppression diode are respectively connected with the first control output end and the second control output end.

6. The electromagnetic brake control apparatus according to claim 4, wherein the single-chip microcomputer is configured with a working state signal output function;
   the electromagnetic brake control apparatus further comprises a working state indicating circuit, and the working state indicating circuit comprises a light emitting diode and a third resistor;
   a first end of the third resistor is connected with a universal output pin of the single-chip microcomputer, and a second end of the third resistor is connected with an anode of the light emitting diode; a cathode of the light emitting diode is grounded; and
   the working state signal output function comprises: controlling the universal output pin to output a signal of a corresponding frequency based on a duty ratio of a signal obtained by the pulse width modulation, wherein the corresponding frequency of the output signal is positively correlated with the duty ratio.

7. The electromagnetic brake control apparatus according to claim 3, wherein the pulse width modulation function comprises: performing the pulse width modulation based on the preset maintaining voltage value;
   the electromagnetic brake control apparatus further comprises a voltage sampling circuit, the voltage sampling circuit comprises a fourth resistor, a fifth resistor and a second Zener diode;
   an analog signal input pin of the single-chip microcomputer is respectively connected with a first end of the fourth resistor, a first end of the fifth resistor and a cathode of the second Zener diode;
   a second end of the fourth resistor is connected with the second output end; and
   a second end of the fifth resistor and an anode of the second Zener diode are grounded.

8. The electromagnetic brake control apparatus according to claim 7, wherein the external power supply is a DC power supply;
   the power supply input end comprises: a positive electrode input end connectable with a positive electrode of the DC power supply, and a negative electrode input end connectable with a negative electrode of the DC power supply;
   the power supply management circuit further comprises: an input protection and filter circuit, and a voltage stabilizing integrated chip;

the input protection and filter circuit comprises: a first fuse, a second transient voltage suppression diode, a Schottky diode and a third capacitor;

the positive electrode input end is a first end of the first fuse, and a second end of the first fuse is respectively connected with a first end of the second transient voltage suppression diode and an anode of the Schottky diode;

the negative electrode input end is a second end of the second transient voltage suppression diode, and the second end of the second transient voltage suppression diode is respectively connected and grounded with a first end of the third capacitor and a ground pin of the voltage stabilizing integrated chip;

the first output end of the power supply management circuit is an output pin of the voltage stabilizing integrated chip; and the second output end of the power supply management circuit is an input pin of the voltage stabilizing integrated chip, wherein the input pin of the voltage stabilizing integrated chip is respectively connected with a cathode of the Schottky diode and a second end of the third capacitor.

9. The electromagnetic brake control apparatus according to claim 7, wherein the external power supply is an AC power supply;

the power supply input end comprises: a neutral wire input end connectable with a neutral wire end of the AC power supply, and a live wire input end connectable with a live wire end of the AC power supply;

the power supply management circuit further comprises: an input protection and rectification circuit, a step-down circuit and a voltage reference circuit;

the input protection and rectification circuit comprises: a second fuse, a thirteenth resistor and a rectifier bridge;

the step-down circuit comprises: a fourteenth resistor, a fifteenth resistor, a sixteenth resistor, a third Zener diode, a fourth Zener diode, a fourth capacitor and a fifth capacitor;

the voltage reference circuit comprises: a seventeenth resistor and a fifth Zener diode;

the live wire input end is a first end of the second fuse, and a second end of the second fuse is respectively connected with a first end of the thirteenth resistor and a first end of the rectifier bridge;

the neutral wire input end is a second end of the thirteenth resistor, and the second end of the thirteenth resistor is connected with a third end of the rectifier bridge;

the second output end of the power supply management circuit is a second end of the rectifier bridge, and the second end of the rectifier bridge is connected with a first end of the fourteenth resistor;

a second end of the fourteenth resistor is connected with a first end of the fifteenth resistor, a second end of the fifteenth resistor is respectively connected with a cathode of the third Zener diode, a first end of the fourth capacitor, a first end of the sixteenth resistor and a first end of the seventeenth resistor;

the first output end of the power supply management circuit is a second end of the sixteenth resistor, and the second end of the sixteenth resistor is respectively connected with a cathode of the fourth Zener diode and a first end of the fifth capacitor;

a second end of the seventeenth resistor is respectively connected with a cathode of the fifth Zener diode and a reference voltage input pin of the single-chip microcomputer; and a fourth end of the rectifier bridge, an anode of the third Zener diode, a second end of the fourth capacitor, an anode of the fourth Zener diode, a second end of the fifth capacitor and an anode of the fifth Zener diode are grounded.

10. The electromagnetic brake control apparatus according to claim 3, wherein the pulse width modulation function comprises: performing the pulse width modulation based on the preset maintaining current value;

the electromagnetic brake control apparatus further comprises a current sampling circuit, the current sampling circuit comprises a sixth resistor and an operational amplifier circuit; the source electrode of the first switch tube is grounded through the sixth resistor;

the operational amplifier circuit comprises: an operational amplifier, a first capacitor, a second capacitor, a seventh resistor, an eighth resistor, a ninth resistor, a tenth resistor, an eleventh resistor and a twelfth resistor;

a power supply input pin of the operational amplifier is connected with the first output end;

a first end of the first capacitor is connected with the first output end, and a second end of the first capacitor is grounded;

an output pin of the operational amplifier is respectively connected with a first end of the seventh resistor and an analog signal input pin of the single-chip microcomputer;

an inverting input pin of the operational amplifier is respectively connected with a second end of the seventh resistor and a first end of the eighth resistor;

a non-inverting input pin of the operational amplifier is respectively connected with a first end of the ninth resistor and a first end of the tenth resistor;

a ground pin of the operational amplifier and a second end of the ninth resistor are grounded;

a second end of the eighth resistor is respectively connected with a first end of the second capacitor and a first end of the eleventh resistor, and a second end of the eleventh resistor is grounded;

a second end of the tenth resistor is respectively connected with a second end of the second capacitor and a first end of the twelfth resistor; and a second end of the twelfth resistor is connected with the source electrode of the first switch tube.

11. The electromagnetic brake control apparatus according to claim 10, wherein the external power supply is a DC power supply;

the power supply input end comprises: a positive electrode input end connectable with a positive electrode of the DC power supply, and a negative electrode input end connectable with a negative electrode of the DC power supply;

the power supply management circuit further comprises: an input protection and filter circuit, and a voltage stabilizing integrated chip;

the input protection and filter circuit comprises: a first fuse, a second transient voltage suppression diode, a Schottky diode and a third capacitor;

the positive electrode input end is a first end of the first fuse, and a second end of the first fuse is respectively connected with a first end of the second transient voltage suppression diode and an anode of the Schottky diode;

the negative electrode input end is a second end of the second transient voltage suppression diode, and the second end of the second transient voltage suppression diode is respectively connected and grounded with a first end of the third capacitor and a ground pin of the voltage stabilizing integrated chip;

the first output end of the power supply management circuit is an output pin of the voltage stabilizing integrated chip; and the second output end of the power supply management circuit is an input pin of the voltage stabilizing integrated chip, wherein the input pin of the voltage stabilizing integrated chip is respectively connected with a cathode of the Schottky diode and a second end of the third capacitor.

12. The electromagnetic brake control apparatus according to claim 10, wherein the external power supply is an AC power supply;

the power supply input end comprises: a neutral wire input end connectable with a neutral wire end of the AC power supply, and a live wire input end connectable with a live wire end of the AC power supply;

the power supply management circuit further comprises: an input protection and rectification circuit, a step-down circuit and a voltage reference circuit;

the input protection and rectification circuit comprises: a second fuse, a thirteenth resistor and a rectifier bridge;

the step-down circuit comprises: a fourteenth resistor, a fifteenth resistor, a sixteenth resistor, a third Zener diode, a fourth Zener diode, a fourth capacitor and a fifth capacitor;

the voltage reference circuit comprises: a seventeenth resistor and a fifth Zener diode;

the live wire input end is a first end of the second fuse, and a second end of the second fuse is respectively connected with a first end of the thirteenth resistor and a first end of the rectifier bridge;

the neutral wire input end is a second end of the thirteenth resistor, and the second end of the thirteenth resistor is connected with a third end of the rectifier bridge;

the second output end of the power supply management circuit is a second end of the rectifier bridge, and the second end of the rectifier bridge is connected with a first end of the fourteenth resistor;

a second end of the fourteenth resistor is connected with a first end of the fifteenth resistor, a second end of the fifteenth resistor is respectively connected with a cathode of the third Zener diode, a first end of the fourth capacitor, a first end of the sixteenth resistor and a first end of the seventeenth resistor;

the first output end of the power supply management circuit is a second end of the sixteenth resistor, and the second end of the sixteenth resistor is respectively connected with a cathode of the fourth Zener diode and a first end of the fifth capacitor;

a second end of the seventeenth resistor is respectively connected with a cathode of the fifth Zener diode and a reference voltage input pin of the single-chip microcomputer; and a fourth end of the rectifier bridge, an anode of the third Zener diode, a second end of the fourth capacitor, an anode of the fourth Zener diode, a second end of the fifth capacitor and an anode of the fifth Zener diode are grounded.

13. The electromagnetic brake control apparatus according to claim 3, further comprising a first transient voltage suppression diode, wherein two ends of the first transient voltage suppression diode are respectively connected with the first control output end and the second control output end.

14. The electromagnetic brake control apparatus according to claim 3, wherein the single-chip microcomputer is configured with a working state signal output function;

the electromagnetic brake control apparatus further comprises a working state indicating circuit, and the working state indicating circuit comprises a light emitting diode and a third resistor;

a first end of the third resistor is connected with a universal output pin of the single-chip microcomputer, and a second end of the third resistor is connected with an anode of the light emitting diode; a cathode of the light emitting diode is grounded; and the working state signal output function comprises: controlling the universal output pin to output a signal of a corresponding frequency based on a duty ratio of a signal obtained by the pulse width modulation, wherein the corresponding frequency of the output signal is positively correlated with the duty ratio.

15. The electromagnetic brake control apparatus according to claim 2, further comprising a first transient voltage suppression diode, wherein two ends of the first transient voltage suppression diode are respectively connected with the first control output end and the second control output end.

16. The electromagnetic brake control apparatus according to claim 1, wherein the first switch circuit comprises a single-chip microcomputer and a first switch tube;

the input end of the first switch circuit is a power supply input pin of the single-chip microcomputer; and the output end of the first switch circuit is a drain electrode of the first switch tube, a gate electrode of the first switch tube is connected with a pulse width modulation (PWM) signal output pin of the single-chip microcomputer, and a source electrode of the first switch tube is grounded.

17. The electromagnetic brake control apparatus according to claim 16, wherein the pulse width modulation function comprises: performing the pulse width modulation based on the preset maintaining current value;

the electromagnetic brake control apparatus further comprises a current sampling circuit, the current sampling circuit comprises a sixth resistor and an operational amplifier circuit; the source electrode of the first switch tube is grounded through the sixth resistor;

the operational amplifier circuit comprises: an operational amplifier, a first capacitor, a second capacitor, a seventh resistor, an eighth resistor, a ninth resistor, a tenth resistor, an eleventh resistor and a twelfth resistor;

a power supply input pin of the operational amplifier is connected with the first output end;

a first end of the first capacitor is connected with the first output end, and a second end of the first capacitor is grounded;

an output pin of the operational amplifier is respectively connected with a first end of the seventh resistor and an analog signal input pin of the single-chip microcomputer;

an inverting input pin of the operational amplifier is respectively connected with a second end of the seventh resistor and a first end of the eighth resistor;

a non-inverting input pin of the operational amplifier is respectively connected with a first end of the ninth resistor and a first end of the tenth resistor;

a ground pin of the operational amplifier and a second end of the ninth resistor are grounded;

a second end of the eighth resistor is respectively connected with a first end of the second capacitor and a first end of the eleventh resistor, and a second end of the eleventh resistor is grounded;

a second end of the tenth resistor is respectively connected with a second end of the second capacitor and a first end of the twelfth resistor; and a second end of the twelfth resistor is connected with the source electrode of the first switch tube.

18. The electromagnetic brake control apparatus according to claim 17, wherein the external power supply is a DC power supply;

the power supply input end comprises: a positive electrode input end connectable with a positive electrode of the DC power supply, and a negative electrode input end connectable with a negative electrode of the DC power supply;

the power supply management circuit further comprises: an input protection and filter circuit, and a voltage stabilizing integrated chip;

the input protection and filter circuit comprises: a first fuse, a second transient voltage suppression diode, a Schottky diode and a third capacitor;

the positive electrode input end is a first end of the first fuse, and a second end of the first fuse is respectively connected with a first end of the second transient voltage suppression diode and an anode of the Schottky diode;

the negative electrode input end is a second end of the second transient voltage suppression diode, and the second end of the second transient voltage suppression diode is respectively connected and grounded with a first end of the third capacitor and a ground pin of the voltage stabilizing integrated chip;

the first output end of the power supply management circuit is an output pin of the voltage stabilizing integrated chip; and the second output end of the power supply management circuit is an input pin of the voltage stabilizing integrated chip, wherein the input pin of the voltage stabilizing integrated chip is respectively connected with a cathode of the Schottky diode and a second end of the third capacitor.

19. The electromagnetic brake control apparatus according to claim 17, wherein the external power supply is an AC power supply;

the power supply input end comprises: a neutral wire input end connectable with a neutral wire end of the AC power supply, and a live wire input end connectable with a live wire end of the AC power supply;

the power supply management circuit further comprises: an input protection and rectification circuit, a step-down circuit and a voltage reference circuit;

the input protection and rectification circuit comprises: a second fuse, a thirteenth resistor and a rectifier bridge;

the step-down circuit comprises: a fourteenth resistor, a fifteenth resistor, a sixteenth resistor, a third Zener diode, a fourth Zener diode, a fourth capacitor and a fifth capacitor;

the voltage reference circuit comprises: a seventeenth resistor and a fifth Zener diode;

the live wire input end is a first end of the second fuse, and a second end of the second fuse is respectively connected with a first end of the thirteenth resistor and a first end of the rectifier bridge;

the neutral wire input end is a second end of the thirteenth resistor, and the second end of the thirteenth resistor is connected with a third end of the rectifier bridge;

the second output end of the power supply management circuit is a second end of the rectifier bridge, and the second end of the rectifier bridge is connected with a first end of the fourteenth resistor;

a second end of the fourteenth resistor is connected with a first end of the fifteenth resistor, a second end of the fifteenth resistor is respectively connected with a cathode of the third Zener diode, a first end of the fourth capacitor, a first end of the sixteenth resistor and a first end of the seventeenth resistor;

the first output end of the power supply management circuit is a second end of the sixteenth resistor, and the second end of the sixteenth resistor is respectively connected with a cathode of the fourth Zener diode and a first end of the fifth capacitor;

a second end of the seventeenth resistor is respectively connected with a cathode of the fifth Zener diode and a reference voltage input pin of the single-chip microcomputer; and a fourth end of the rectifier bridge, an anode of the third Zener diode, a second end of the fourth capacitor, an anode of the fourth Zener diode, a second end of the fifth capacitor and an anode of the fifth Zener diode are grounded.

20. The electromagnetic brake control apparatus according to claim 1, further comprising a first transient voltage suppression diode, wherein two ends of the first transient voltage suppression diode are respectively connected with the first control output end and the second control output end.

* * * * *